March 14, 1944. H. P. ELLIOTT 2,344,345
ADDRESSING MACHINE
Filed July 2, 1941 8 Sheets-Sheet 1

Inventor,
Harmon P. Elliott
atty

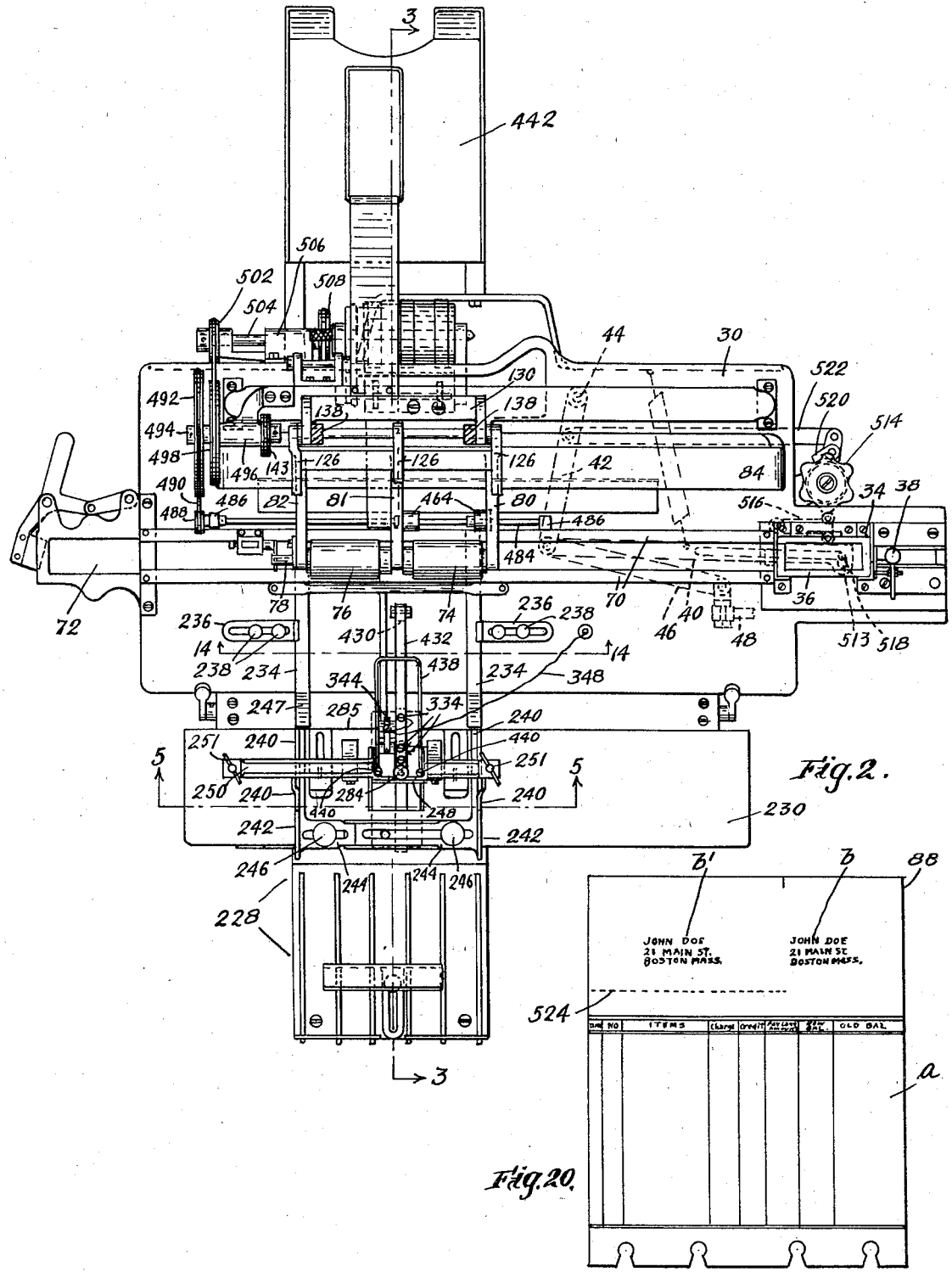

March 14, 1944.　　　H. P. ELLIOTT　　　2,344,345
ADDRESSING MACHINE
Filed July 2, 1941　　　8 Sheets-Sheet 3

Inventor.
Harmon P. Elliott

March 14, 1944.    H. P. ELLIOTT    2,344,345
ADDRESSING MACHINE
Filed July 2, 1941    8 Sheets-Sheet 4
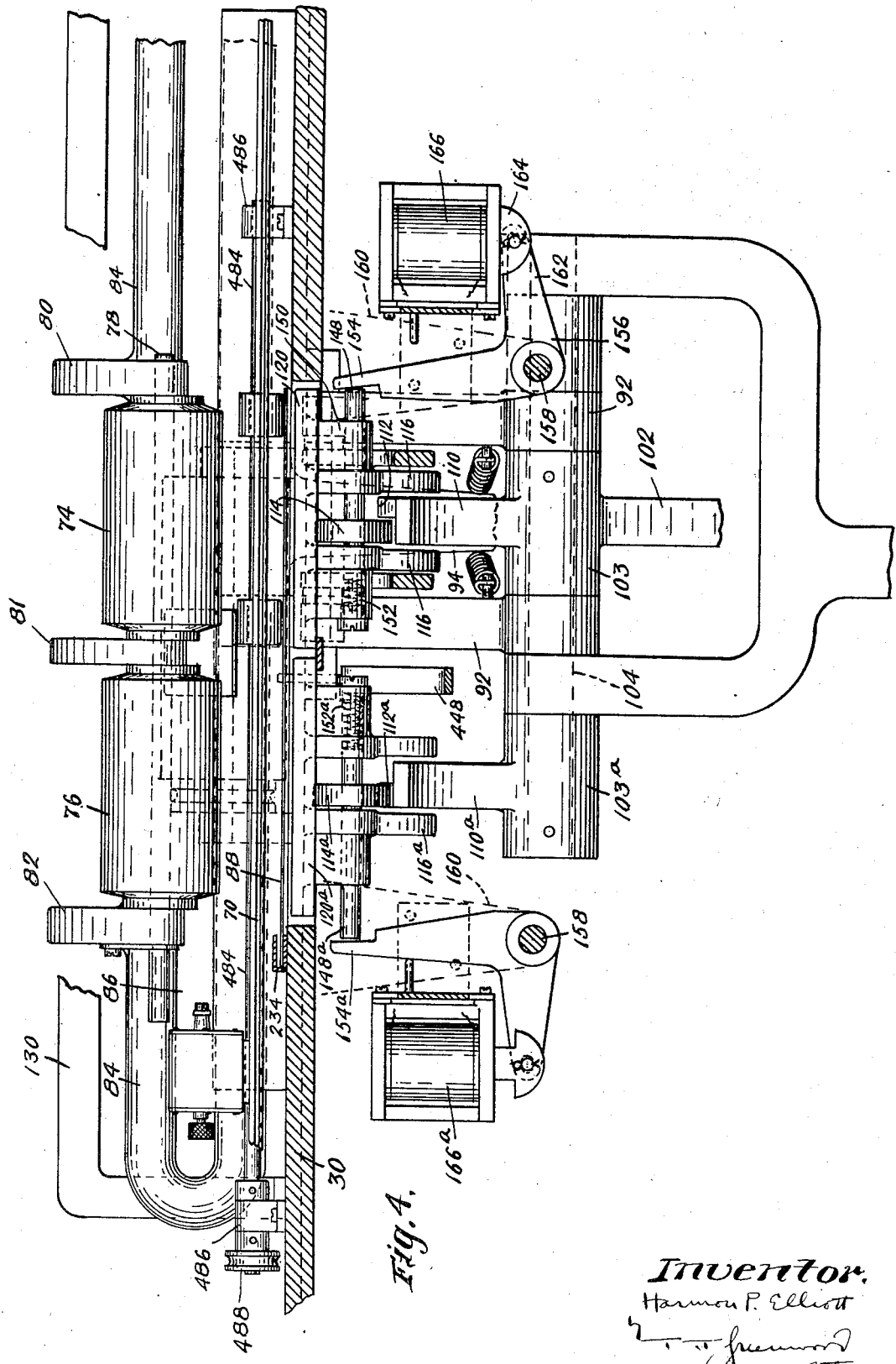
Inventor.
Harmon P. Elliott March 14, 1944.  H. P. ELLIOTT  2,344,345
ADDRESSING MACHINE
Filed July 2, 1941  8 Sheets-Sheet 5
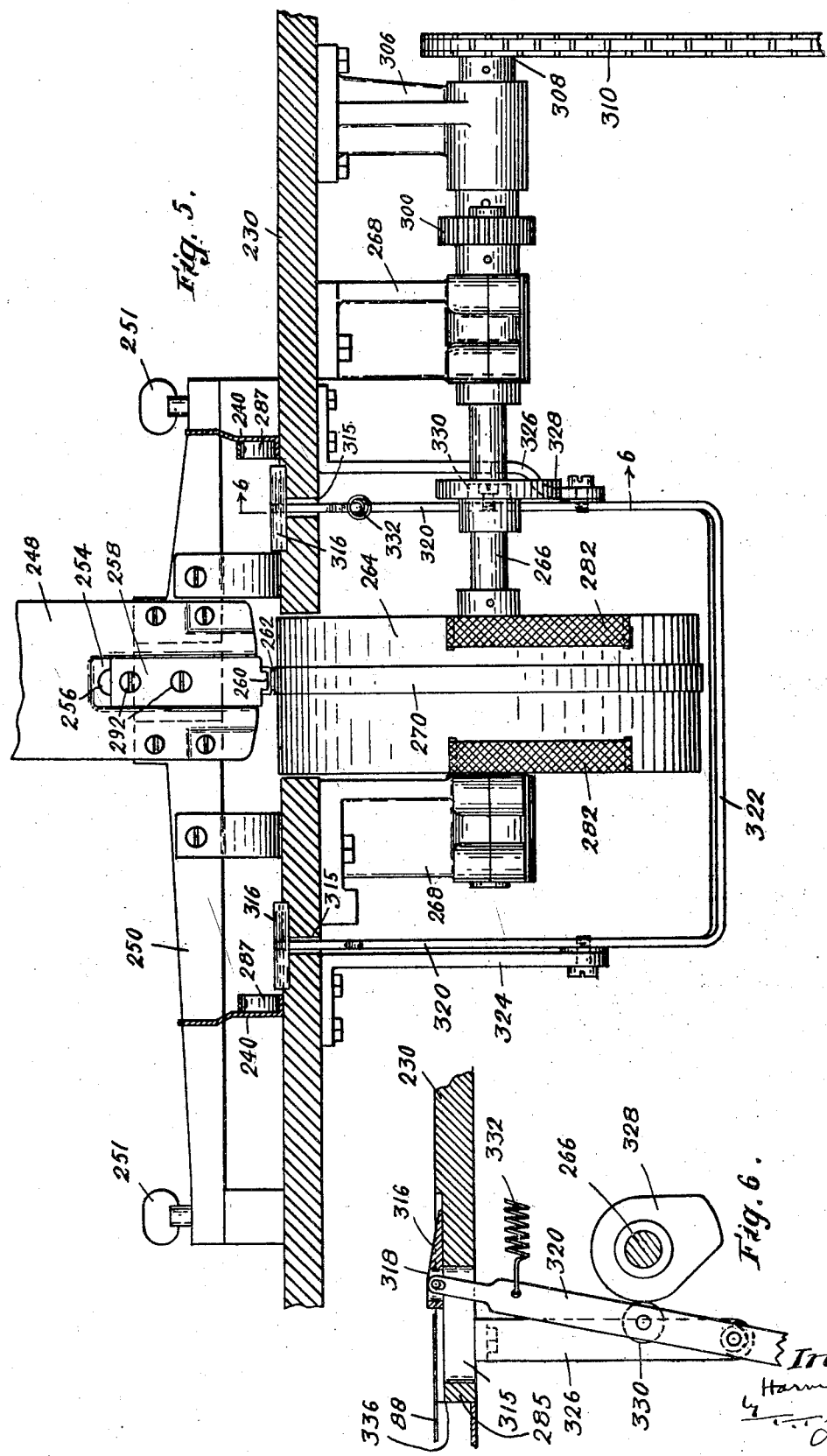
Inventor.
Harmon P. Elliott March 14, 1944. H. P. ELLIOTT 2,344,345
ADDRESSING MACHINE
Filed July 2, 1941 8 Sheets-Sheet 6
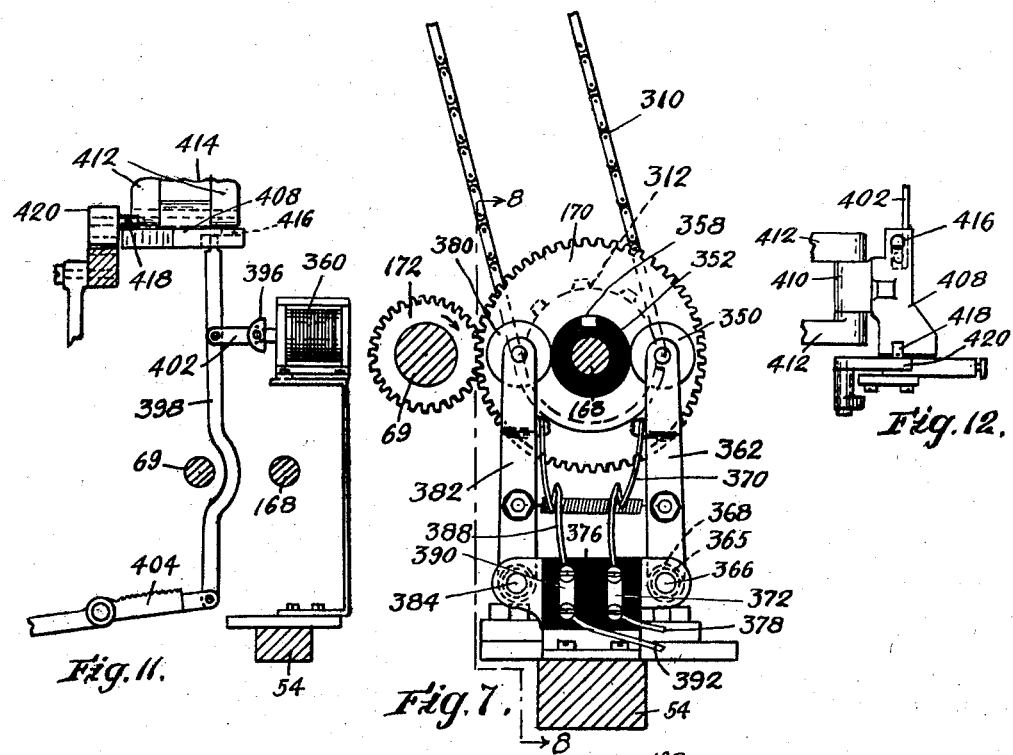
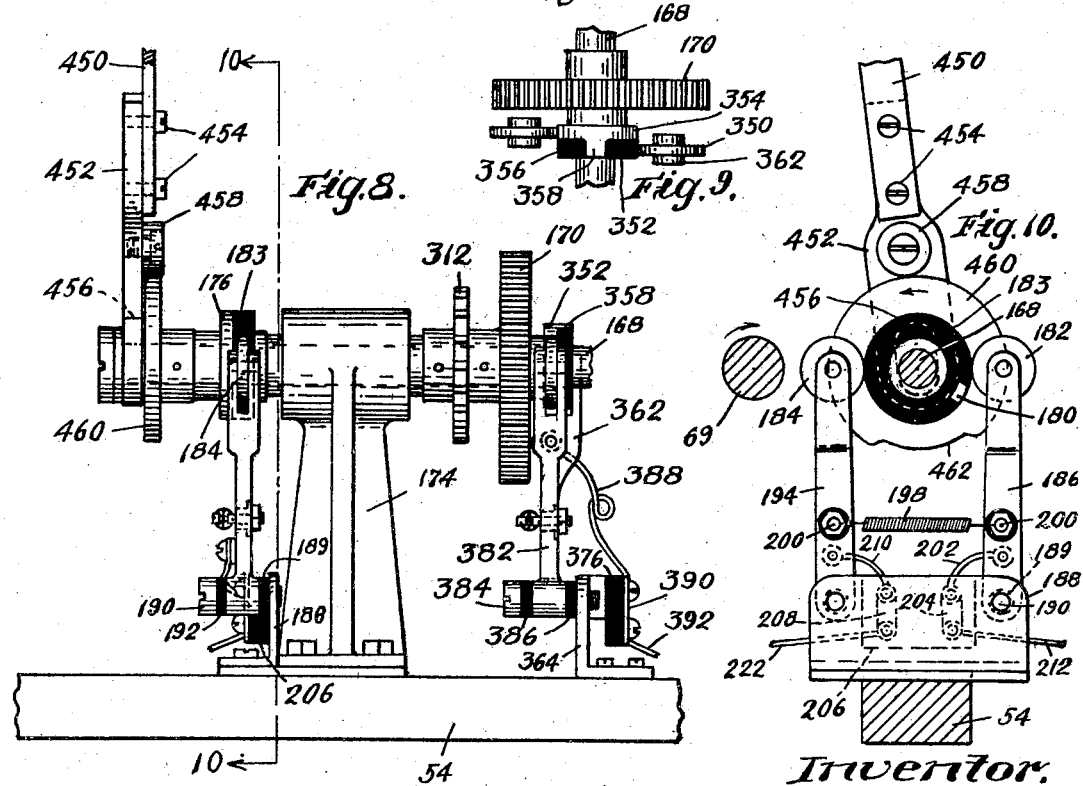
Inventor.
Harmon P. Elliott March 14, 1944.  H. P. ELLIOTT  2,344,345
ADDRESSING MACHINE
Filed July 2, 1941  8 Sheets-Sheet 7
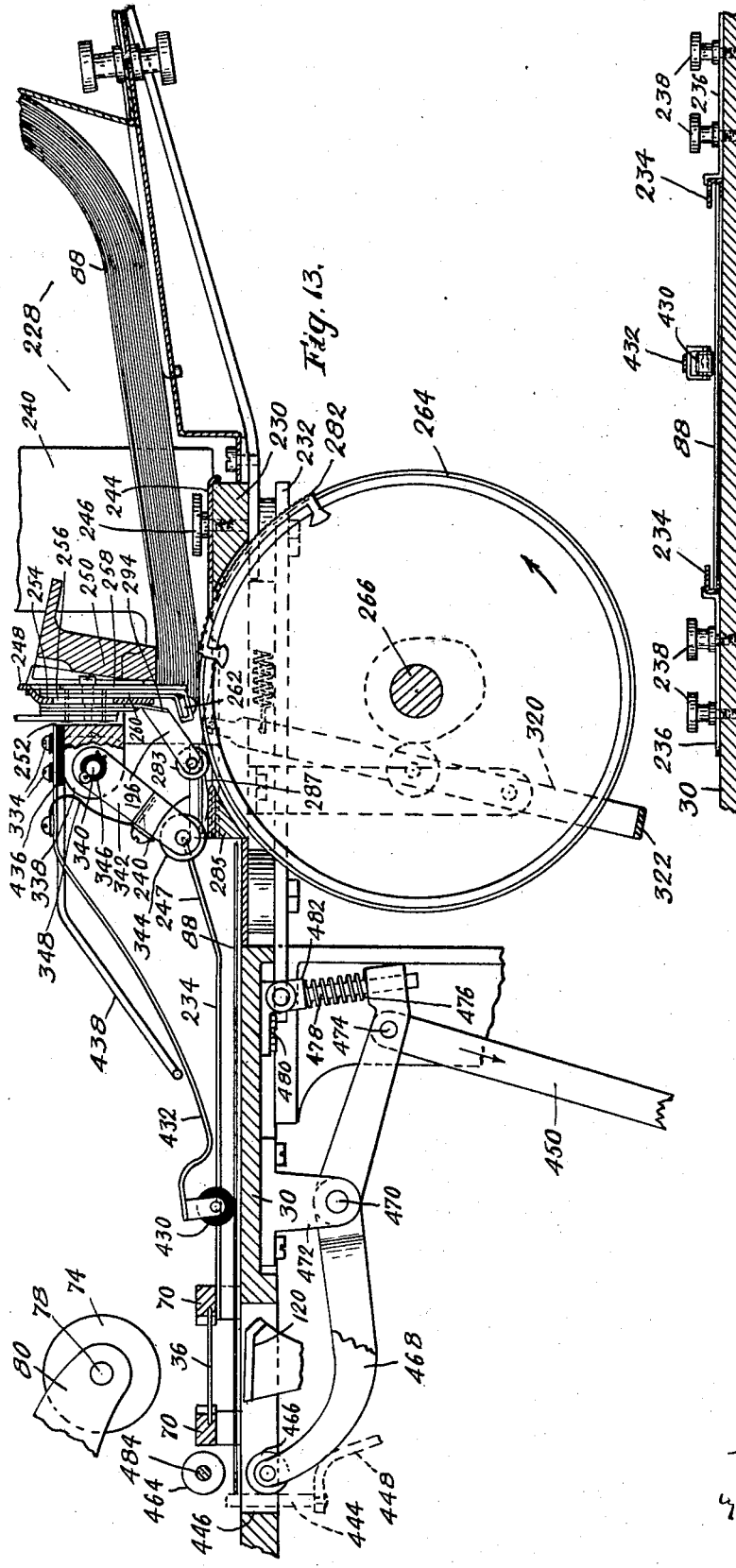
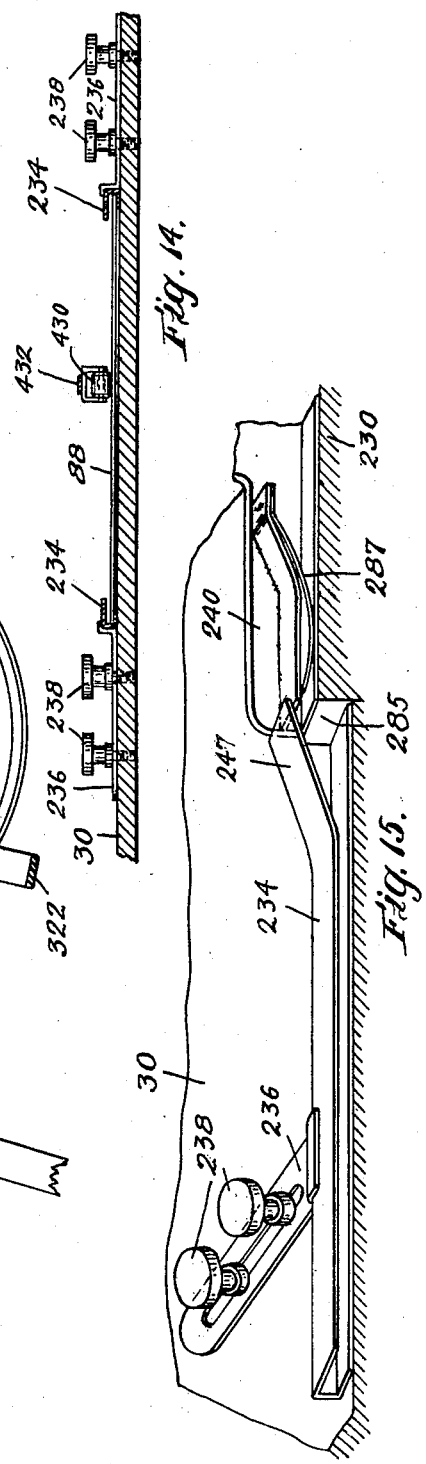
Inventor,
Harmon P. Elliott

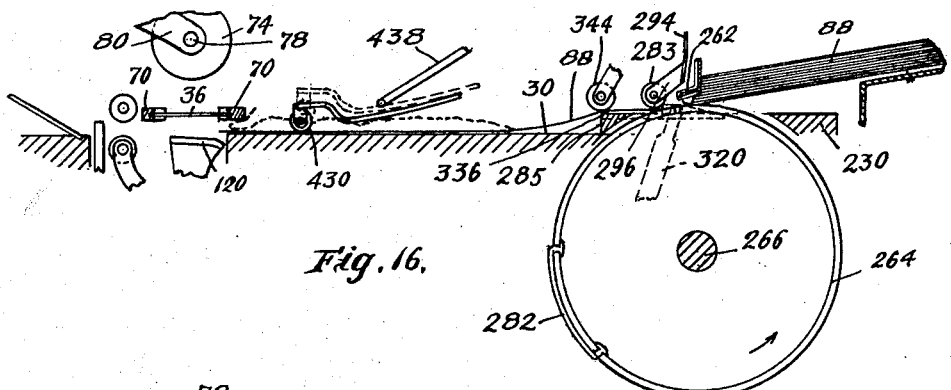
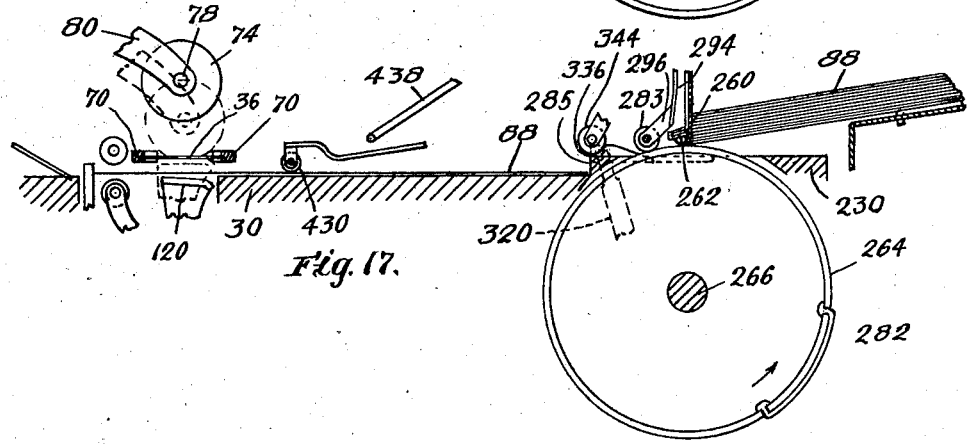
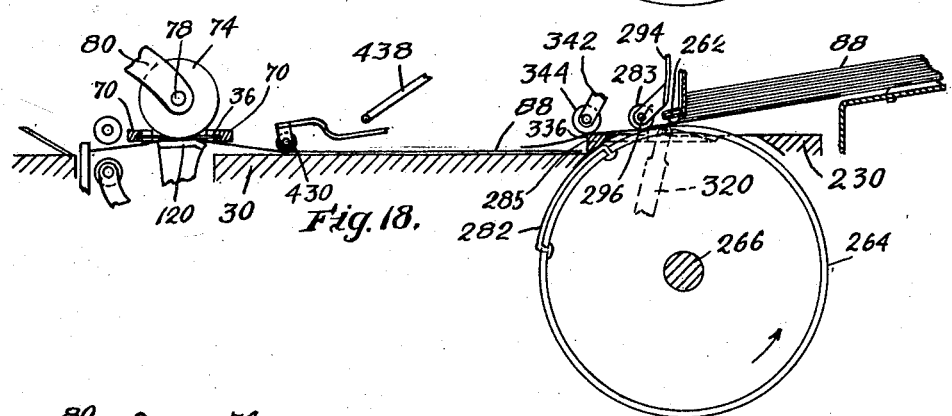
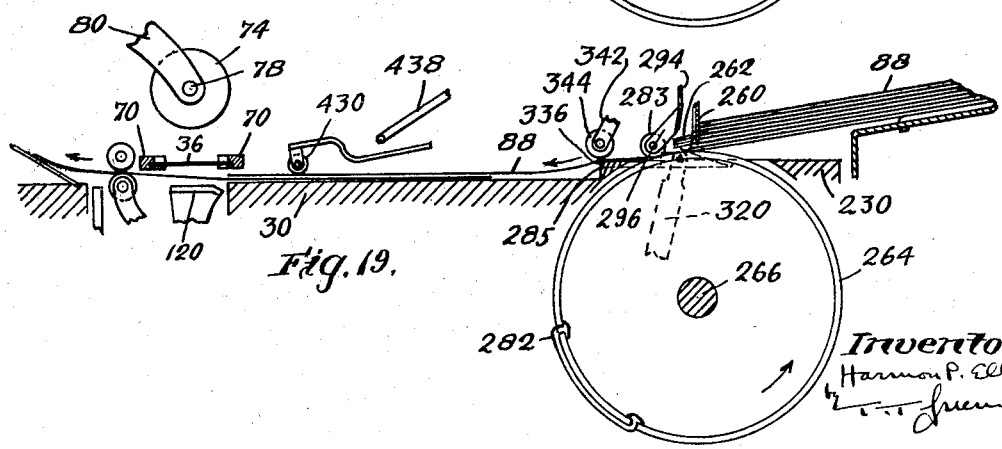

Patented Mar. 14, 1944

2,344,345

UNITED STATES PATENT OFFICE 2,344,345

ADDRESSING MACHINE

Harmon P. Elliott, Watertown, Mass.

Application July 2, 1941, Serial No. 400,769

24 Claims. (Cl. 101—48)

This invention relates to printing or addressing machines of the type employing changeable address-bearing devices, especially stencils, and, as illustrated herein, relates more particularly to an addressing machine arranged to apply the same address successively to different portions of a bill when the address printing device or stencil is fed into successive address printing positions.

Department stores and other mercantile establishments send out monthly bills or statements having a top portion which is perforated and arranged to be torn off and returned to the store when the purchaser makes payment on his account. This arrangement is oftentimes unsatisfactory since the tearing off of the top portion of the bill or statement does not leave any identifying data on the remainder of the bill which will definitely connect the purchaser with the bill. Thus, oftentimes, disputes may arise between the seller and the purchaser as to the exact amount owed. It has been proposed to provide a bill or statement with a top portion perforated only part way across the top of the bill so that the entire top portion of the bill is not torn off but a portion is left on the top which contains a second address portion which remains permanently connected to the bill or statement.

One object of the present invention is to provide an addressing machine which will provide the bill, as described, with the two addresses. In accordance with this object, a feature of the invention resides in an addressing machine having a sheet feeding mechanism, a holder for a stack of printing devices, especially stencils, printing mechanism comprising two printing heads, and feeding mechanism for moving the stencils or printing devices from the holder into successive printing positions beneath the printing heads. As illustrated, the printing heads are operated from a common source of power and are arranged to be operative on the stencil in one printing position and then this head is arranged to be inoperative during the next operation when the stencil or printing device is in the second printing position.

A further object of the invention is an improved form of mechanism for feeding successive bill forms from a stack of such forms to the printing mechanism in such manner that the bill feed does not hinder or slow down the speed of addressing and particularly in such manner that a bill form is presented to the action of the addressing or printing mechanism during the intervals between each pair of addressing operations.

An additional object of the invention is the provision of improved bill-form feeding mechanism wherein the bills are advanced from the stack to the addressing mechanism in momentarily overlapping relation with means for independently feeding the overlapping and the overlapped bills predetermined amounts.

Another object of the invention is to provide improved sheet feed controlling means whereby the machine will be rendered inoperative when the sheets are improperly fed into printing position.

A further object of the invention is generally to improve upon the construction and operation of addressing machines.

With the above and other objects and features in view, the invention will now be described with reference to the accompanying drawings in which:

Fig. 2 is a plan view of the machine illustrated in Fig. 1;

Fig. 4 is a sectional view on a somewhat enlarged scale and with parts omitted taken along the line 4—4 of Fig. 3;

Fig. 5 is a sectional view on a somewhat enlarged scale taken along the line 5—5 of Fig. 2;

Fig. 6 is a detailed view taken along line 6—6 of Fig. 5 of a part of the pusher mechanism for moving the stack-ejected sheet toward printing position;

Fig. 7 is a sectional view taken along line 7—7 of Fig. 1 of switch mechanism for controlling the operation of the printing head and the sheet feeding mechanism of the machine;

Fig. 8 is a front elevation of switch mechanism of Fig. 7 taken along line 8—8 of Fig. 7;

Fig. 9 is a plan view of the controlling mechanism for the sheet feed, as illustrated in Figs. 7 and 8;

Fig. 10 is a section taken along the line 10—10 of Fig. 8 and illustrating the control mechanism for the printing heads;

Fig. 11 is a detailed view illustrating the magnet controlled mechanism for stopping the machine, taken along the line 11—11 of Fig. 1;

Fig. 12 is a plan view of a portion of the mechanism illustrated in Fig. 11;

Fig. 13 is a view in section illustrating, on a somewhat enlarged scale, the construction of the sheet feed and sheet feed control mechanism, and taken along line 3—3 of Fig. 2;

Fig. 14 is a view in section of the sheet guideway taken along the line 14—14 of Fig. 2;

Fig. 15 is a perspective view on an enlarged scale illustrating the construction of one of the sheet guideways;

Fig. 16 is a diagrammatic view of the sheet-feeding and addressing elements of Fig. 13, with a stack-ejected sheet in position to enter between the addressing elements;

Fig. 17 illustrates the position of the parts with the stack-ejected sheet advanced into printing position;

Fig. 18 illustrates the address-applying position of the addressing elements and a partially ejected second sheet;

Fig. 19 illustrates the relative position of the parts and the sheets after the addressing operation and with the addressed sheet partially out of the addressing elements;

Fig. 20 is a view of a bill head having two addresses applied thereto and which is the product of the present machine;

Figure 1:
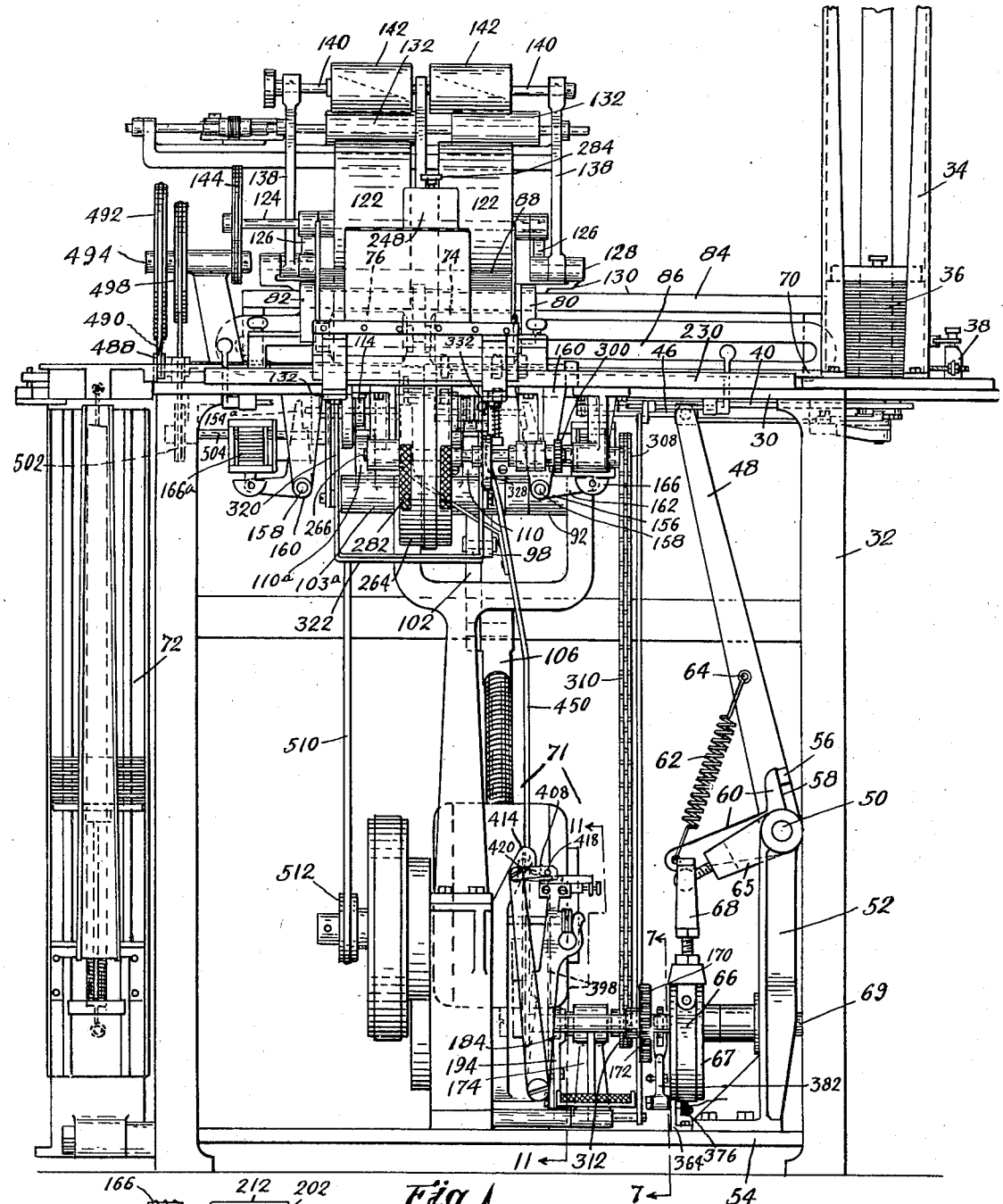
Fig. 1 is a view in front elevation of a machine illustrating a preferred embodiment of the present invention.

The illustrated machine shown herein as embodying the present invention includes a table 30 supported at the top of a base or frame 32. A stencil holder 34 is located at the right hand end of the table and extends upwardly therefrom. The successive lowermost stencils 36 of the stack are moved from the stack 34 by means of a reciprocatory pusher 38 of usual construction. The pusher 38 is connected to one end of a substantially horizontal link 40, Figs. 1 and 2, which at its other end is pivotally secured to the forward end of a link 42 pivoted at 44 to the under side of the table 30. The forward end of the link 42 is also pivotally connected to one end of a link 46 which at its other end is pivotally secured to the upper end of a substantially vertical operating arm 48 which in turn is pivoted at its lower end upon a substantially horizontal shaft 50 journalled in the upper end of a bracket 52 fixed by suitable bolts to a horizontal cross member 54 fixed in any suitable manner to the bottom portion of the frame 32. The lower end portion of the substantially vertical arm 48 is provided with a forwardly projecting boss 56 which is arranged to be engaged by an upwardly extending arm 58 of a bell crank lever 60 also pivoted to the shaft 50. The free end of the bell crank lever 60 is provided with a pin for receiving the end of a coil spring 62 which at its other end is secured to a pin 64 fixed to the link 48. The spring 62 is always under tension and, consequently, the link 48 is moved toward the left under the influence of this spring. Movement of the link in the other direction is effected through connections to an eccentric strap 66 surrounding an eccentric 67 fixed to a jack shaft 69 forming a part of the usual power mechanism 71 of machines of this type. The eccentric strap is connected by an adjustable link 68 to an arm 65 which is secured to or formed as a part of the bell crank lever 60. Thus, when the eccentric 67 is rotated the link 68 moves upwardly and rotates the lever arm 65 and the bell crank lever 60 connected thereto in a clock-wise direction and, since the upwardly extending arm of the bell crank lever 60 engages the forwardly projecting boss 56, the link 48 is also rotated in a clockwise direction and toward the right. By this construction, the pusher 38 is returned to its initial position positively by connections from the eccentric 66 and is moved in a forwarding direction by the spring 62. Thus, if a stencil 36 is improperly positioned in the bottom of the holder 34 damage thereto will be prevented.

The lower end of the holder 34 is aligned with horizontal tracks 70 which are spaced above the top surface of the table 30 and are supported thereon in any suitable manner. The tracks 70 extend entirely across the table 30 and terminate at the left hand edge thereof. The stencils are fed step-by-step from the bottom of the holder through the printing positions and out of the ends of the tracks 70 and into a stencil receiving holder 72 which may be of any usual construction and which need not be further described herein.

The printing or addressing mechanism includes two printing or ink rolls 74 and 76 which are disposed over the stencil tracks and are rotatable on a shaft 78 carried at the front ends of forwardly extending arms 80, 81 and 82 which are fixed to a yoke 84 disposed in the rear of the stencil tracks 70. The yoke is provided with an elongated horizontal opening 86 through which a sheet 88 is adapted to be moved. The yoke 84 is pivotally supported on a shaft 90 carried by a bracket 92 fixed to the bottom surface of the table 30. The yoke 84 has a depending arm 94 which is connected by an adjustable screw 96 to a link 98 which is pivoted at one end to said adjustable screw 96 and at the other end to an arm 102.

The arm 102 is integral with a hub 103 fixed to a shaft 104 journalled in a downwardly extending portion of the bracket member 92. The lower end of the arm 102 is pivotally connected to the upper end of a connecting rod 106 which is operated by the power mechanism 71 in a manner which is well known in the art and which need not be described in detail herein. The hub 103 is provided with an upwardly extended cam arm 110 having on one lateral edge part thereof a radially projecting cam surface 112 which is arranged to engage a cam roll 114 carried by the forward end portion of a platen carrying arm 116, pivoted to the bracket 92 by a pin 118. The upper end of the platen carrying arm 116 is provided with a platen 120 having a flat surface which is arranged to engage the bottom surface of the sheet 88 and to press the sheet upwardly and into engagement with the stencil 36 in printing position. Thus, when the arm 106 is reciprocated the ink-carrying impression or printing roll 74 is moved downwardly toward the stencil 32 and the platen 120 can be moved upwardly toward the stencil and ink carried by the roll 74 is forced through the openings in the stencil and onto the sheet of paper 88.

Associated with the impression or printing roll 76 is a second platen 120a carried by a pivoted arm 116a and having a cam roll 114a, the construction being essentially the same as the first described platen. The roll 114a is adapted to be engaged by the cam face 112a of a cam arm 110a integral with a hub 103a fixed to the oscillating shaft 104. Thus both cams 112 and 112a are caused to be reciprocated in unison. The printing operations of the two printing rolls and platens are alternated, however, by the lateral shifting of the cam rolls 114 and 114a as will be presently explained.

The printing rolls 74 and 76 are in continuous rolling engagement with the ink peripheries of a pair of ink transfer rolls 122 which are journalled on a shaft 124 carried by the forward ends of arms 126. The arms 126 are pivotally supported at 128 on an upstanding bracket 130 carried by the table 30 in the rear of the yoke 84. A pair of ink distributing rolls 132 are adapted to be in rotatable engagement with the transfer rolls or drums 122 when they are in elevated position and to apply the ink to the surfaces thereof at such times. The ink distributing rolls 132 are carried by a shaft 134 which is rotatably mounted and which is free for axial movement in forwardly extending arms 136 secured to the upper end portion of an arm 138 pivotally secured to the bracket 130. The upper end portions of the arms 138 are arranged to receive a shaft 140 which carries independent ink containing rolls 142 and which are supported in rotatable engagement with the surfaces of the rolls 132. The rolls 132 are reciprocated axially by any suitable means in order to distribute the ink uniformly on the surface of the transfer rolls. The reciprocating mechanism is not shown herein since such mechanism is well known in the prior art.

The ink transfer rolls 122 are continuously driven by means including a belt 144 and a jack shaft 146 from the power mechanism of the machine. The mechanism described just above is substantially the same as that disclosed in my United States Letters Patent No. 1,921,511, granted August 8, 1933. In the present machine the platens are arranged to move toward their respective printing rolls alternately. That is to say, during the first printing operation to be performed upon a sheet the printing roll 74 and its associated printing platen 120 are moved toward each other while the printing platen 120a associated with the printing roll 76 is disconnected from the power mechanism of the machine and is inoperative to perform a printing operation upon the sheet. However, after the stencil has been moved from below the printing roll 74 and into position below the printing roll 76, the platen 120a associated with the printing roll 76 is rendered operative and the platen 120 associated with the prining roll 74 is rendered inoperative. Thus, during the second reciprocation of the printing rolls 74 and 76 the printing operation is performed only by the printing roll 76.

To obtain this selective operation of the printing rolls 74 and 76, mechanism has been provided for shifting the cam rolls 114 and 114a into and out of alignment with the cam surfaces 112 on the upwardly extending arms 110 and 110a. As shown most clearly in Fig. 4, the upwardly extending arms 110 and 110a are provided with cam surfaces 112 and 112a which extend only about half way across the width of the arms or members 110 and 110a. The cam rolls 114 and 114a are of substantially the same width as the cam surfaces and are caused to be moved into and out of alignment with these cam projections 112 to condition the associated platens for reciprocation and for preventing the reciprocation. As shown in Fig. 4, the left hand roll 114a is in line with the projection 112a while the right hand cam roll 114 has been moved out of line with the cam projection 112. Thus, the left hand platen 120 will be moved upwardly upon reciprocation of the link 102 while the platen 120 will remain in the position shown in Fig. 4 without being reciprocated. Thus a printing operation will be performed upon a stencil which is in printing position below the roll 76 while the stencil which is located below the printing roll 74 will not be operated upon during this cycle of operation of the machine. When the roll 114 is in line with its cam 112 and the roll 114a is out of line with its cam the right hand printing roll 74 will perform a printing operation while none will be effected by the left hand roll 76.

Since the two cam rolls 114 and 114a are each mounted and operated in substantially the same manner only one of the cam rolls and its mounting will be described in detail. The cam roll 114 is fixed to a shaft 148 which is rotatably mounted in depending brackets 150 extending downwardly from and forming a part of the bottom surface of the platen 120 at its right hand end. The shaft 148 bears against a coaxial compression spring 152 which urges the shaft 148 and the roll 114 carried thereon constantly toward the right and into alignment with the right hand cam projection 112. The projecting right hand end of the rod is arranged to be engaged by an arm 154 of a bell crank lever 156 pivoted by a shaft 158 to the lower end of a depending bracket member 160 fixed in any suitable manner to the bottom surface of the table 30. The other and horizontal arm 162 of the bell crank lever 156 is pivotally secured to an armature 164 which is arranged to be moved upwardly when a magnet coil or winding 166 is energized under control of mechanism later to be described. When the coil 166 is energized the armature 164 is moved upwardly and the bell crank lever 166 is rotated in a counter-clockwise direction so that the upper end portion of the arm 154 engages the projecting end of the roll shaft 148 and moves the shaft toward the left against the pressure of the spring plunger 152 to move the cam roll 114 out of line with the cam projection 112 on the arm or member 110. It is apparent that the right hand magnet coil 166 is similarly effective to move its associated shaft 148 toward the left to move the cam roll 114 out of line with its associated cam projection 112.

Similarly, the roll 114a is fixed to a rotatable shaft 148a slidable axially under urge of a compression spring 152a to carry the roll into operative relation with the associated cam 112a and moved in the opposite direction, or into a platen disabling position by the arm 154a of a bell crank operated by the solenoid or magnet winding 166a.

Thus, both rolls 114 and 114a are biased for movement in a direction to cause the platens to be reciprocated by their associated cams and the rolls selectively are moved in the opposite direction and are held out of cooperative relation with the associated cams during the oscillation thereof to disable the associated platens and prevent an effective printing operation.

The mechanism for controlling the operation of the printing platens 120 is most clearly illustrated in Figs. 1 and 7 to 10, inclusive. As shown in Fig. 8, a control or timing shaft 168 is driven from the jack shaft 69 through spur gears 170 and 172 fixed to the respective shafts, the gear 172 fixed to the jack shaft 69 having half the pitch diameter of the gear 170 fixed to the timing shaft 168 so that the latter shaft is rotated at one-half of the speed of the jack shaft 69.

The shaft 168 is rotatably mounted in a bearing formed in the upper end portion of a vertically extending bracket 174 which is fixed to the cross piece 54 by bolts or other suitable fastenings.

A metal collar 176 is fixed to the shaft 168 to the left of the bracket 174. As shown most clearly in Fig. 10, the collar 176 is provided with an axially extending projection 180. An insulating disc 183 having the same diameter as the collar 176 and having a slot or recess to receive the projection 180 is secured to and against the face of the collar 176 by any suitable means. Metal rollers 182 and 184 are arranged on opposite sides of the insulating disc 183 and are arranged to bear thereagainst and against and in electrical engagement with the projection 180 when said projection is rotated into position, said projection, through its disc, being grounded to the timing shaft and to the frame of the machine. As shown most clearly in Fig. 10, the roll 182 is rotatably mounted in the upper end portion of a substantially vertically extending arm 186 which is pivotally secured at its lower end portion to a bracket member 188 fixed in any suitable manner to the cross piece 54. The arm 186 is insulated from the bracket 188 by an insulating bushing 189 (not shown) surrounding a cap screw 190 which forms a pivot for the arm 186. The arm 186 is further insulated from the bracket 188 by insulating washers 192 which surround the shank of the cap screw 190 and are disposed on opposite sides of the lower end portion of the arm 186 and prevent electrical contact between the arm and the head of the cap screw and the bracket 188.

The roller 184 is similarly mounted on an arm 194 which is pivoted at its lower end portion to the opposite side portion of the bracket 188. The lower end portion of the arm 194 is insulated from the bracket 188 in the same manner as the arm 186. The arms 186 and 194 are urged toward each other and into engagement with the metal collar 176 and the insulating collar 183 by a tensioned coil spring 198 which is connected to substantially the mid portion of each of the arms 186 and 194 by pins 200 of insulating material.

The arm 186 is connected by a suitable conductor 202 to a connector 204 secured to an insulating plate 206 which is fixed in any suitable manner to the bracket 188. The arm 194 is electrically connected with a connector 208 by a suitable conductor 210, the connector 208 being also secured to the insulating supporting plate 206.

A conductor 212 is secured to the connector 204 at one end and at its other end to one terminal of a platen-controlling solenoid or winding 166, the other terminal of the solenoid being connected by a suitable conductor 216 to one terminal of the secondary winding 218 of a suitable transformer 220. The other terminal of the secondary winding 218 is grounded on the machine frame 32. A conductor 222 is electrically connected at one end to the connector 208 and at its other end to one terminal of the other platen-controlling solenoid or winding 166a, the other end of said winding being connected to the transformer output conductor 216.

Thus, when the projection 180 engages the roll 182, the circuit through the electro-magnet 166 is completed and its armature is pulled upwardly into the position shown at the right hand side portion of Fig. 4 to move the cam roll 114 out of alignment with the cam surface 112 on the arm 110. Thus, the platen 114 under the printing roll 74 is rendered inoperative. At the same time the left hand electro-magnet 166a is un-energized to disable its associated platen so that the cam roll 114a associated with the platen 120a under the printing roll 76 is in alignment with the cam projection 112a and hence the platen 120a can move upwardly and into engagement with the under surface of the sheet in printing position as the roll 76 is moved downwardly, thus performing a printing operation on the sheet. When the projection 180 moves out of engagement with the roller 182, the magnet coil 166 is de-energized and as the shaft 168 continues its rotation, the projection 180 will engage the roller 184, thus completing the electric circuit through the left hand electro-magnet 166a. The armature associated therewith will be attracted to move the roll 114a out of alignment with the cam projection 112a. Thus, during this portion of the cycle of operation of the machine, the left hand platen 120a cannot move upwardly to effect a printing operation upon the sheet. During this portion of the cycle of operation of the machine, the left hand electro-magnet 166 is un-energized and the left hand cam roll 114 is in alignment with its associated cam projection 112 under the influence of the spring 152. Thus, the right hand platen 120 is in condition to perform a printing operation.

The construction and arrangement of the rolls 114, 114a and the cams 112, 112a is such that the roll shifting electro-magnets need not be maintained energized during a complete oscillation of the cams. The timing of the energization of the magnets is such that they are alternately energized just prior to the engagement of a cam with its roll. The energization of the magnet shifts the roll laterally and the energization need be maintained only until a part of the cam becomes positioned in the path of spring-urged movement of the roll. The magnet can the be de-energized and the cam will block the movement of the roll into alignment with the cam and release it for such movement only at the end part of the complete oscillatory movement of the cam.

Figure 3:
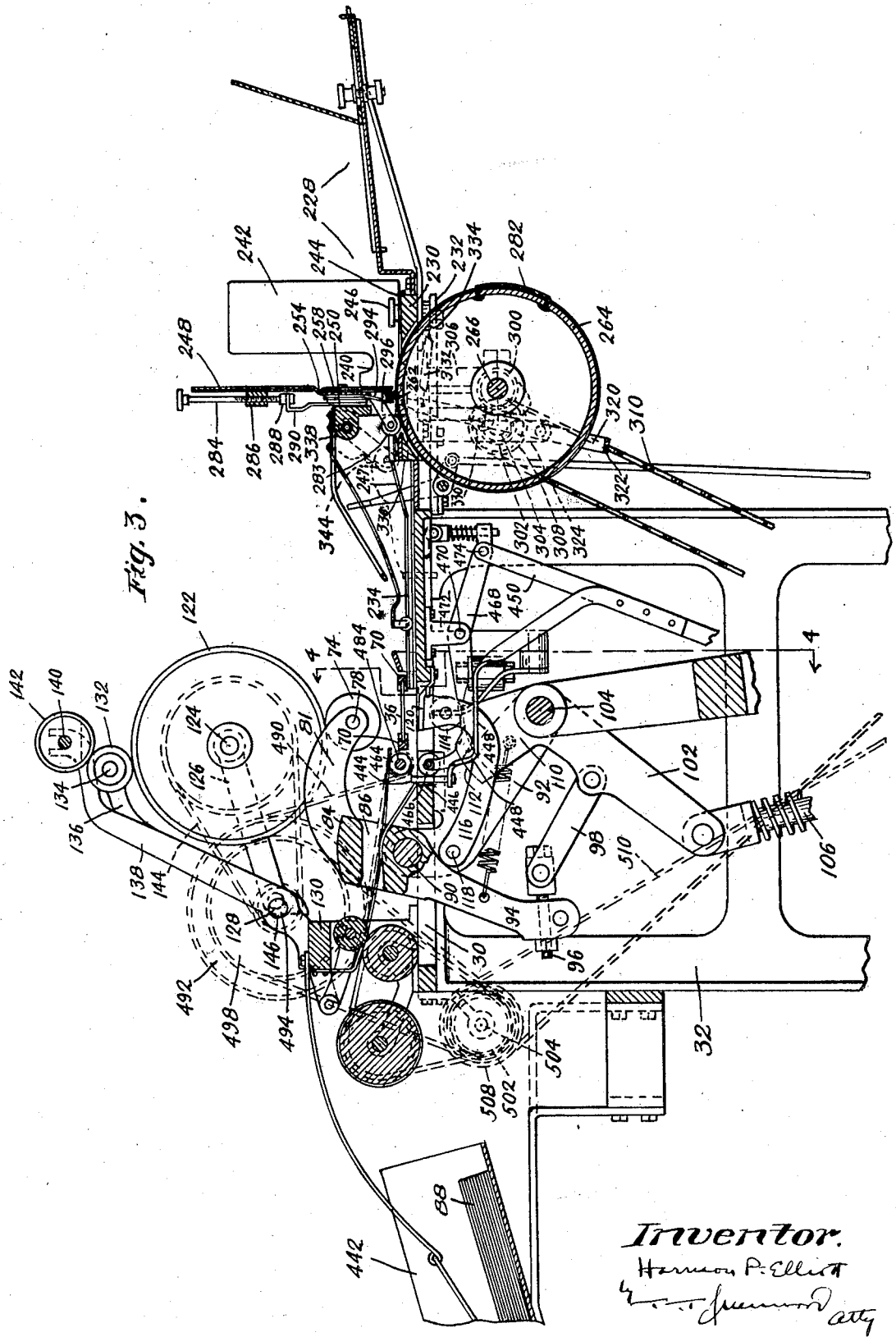
Fig. 3 is a transverse sectional view taken along line 3—3 of Fig. 2.

The present machine is provided with a bill holder 228, see especially Figs. 2, 3 and 13, for supporting a substantially vertical stack of bills or statements which are to be removed successively from the bottom of the stack and fed into printing position. The holder 228 is supported on a horizontal shelf 230 located in front of the table 30 and is supported on forwardly extending horizontal bars 232 which are suitably secured to the under surface of the table 30 and project forwardly therefrom.

The holder 228 is in alignment with a pair of parallel tracks 234 adjustably secured to the top surface of the table 30 and forming a guideway for guiding the successive sheets to the printing position. The tracks 234 are each provided with outwardly projecting extensions 236 which are slotted to receive clamping screws 238 which extend through the slot and are threaded into holes formed in the table 30. Thus the tracks 234 may be adjusted toward and away from each other to accommodate sheets of different widths. The right hand track 234 extends rearwardly and terminates under the front stencil track 70, while the left hand track 234 extends rearwardly beyond the rear stencil track 70. The entrance to the tracks 234 is aligned with forward extensions 240 of upwardly extending plates 242 which form the right and left hand sides of the holder 228. As shown most clearly in Fig. 2, the portions 240 are provided with inwardly extending floor members 244 which are slotted to receive clamping screws 246 which are threaded into openings formed in the shelf 230 by which arrangement the width of the holder may be adjusted to accommodate bills of different widths.

The extensions 240 are higher than the bottoms of the tracks as is most clearly shown in Figs. 13 and 15 to permit one bill to be projected from the holder above the previously expelled bill. The upper wall of each track is provided with an upwardly inclined section 247 that is terminated above the bottom of its associated forward extension to guide the leading edge of an advancing bill into the body of the track.

The holder 228 is provided with an upstanding rear plate 248 which is secured adjacent to its bottom end portion to a horizontal supporting bar 250 which is located above the tracks 234 and is secured by thumb nuts 251, see Fig. 5, to the shelf 230. The bar 250 is provided with a slot or recess 252 (Fig. 13) which is arranged to receive an embossed portion 254 formed in the lower end of the plate 248. The wall of the embossment is provided with an elongated vertical slot 256 for receiving clamping means for adjustably securing an end gate 258 in vertical adjusted position. As shown most clearly in Fig. 5, the end gate 258 fits into the recess 254 and is provided at its lower end portion with a depending projection 260 which is arranged to receive and support a rubber pad 262 for preventing undesired removal of the lower sheets in the holder 228.

The lower end portion of the gate 258 is located just above the periphery of a sheet feeding drum 264 secured to a shaft 266 and journalled in bearings formed in the lower end portion of brackets 268 suitably secured to the lower surface of the shelf 230. The sheet feeding drum 264 is provided with an intermediate raised peripheral portion 270 which underlies and is substantially in contact with the rubber sheet feed controlling pad 262. The feed drum 264 is also provided with a pair of opposed corrugated rubber bands 282 which are secured to the drum at the opposite side edges thereof. The remaining peripheral portion of the drum is smooth. The rubber bands 282 have sufficient frictional engagement therewith to move the successive lowermost sheets out of the stack and toward printing position, the smooth part of the drum, co-acting with the idler pinch roll 283 acting on the moving displaced sheet to advance it completely out of the holder and into a position where the trailing edge of the sheet is just at the exit of the pinch roll and on the elevated ledge 285 and is retained removably in position by the light pressure of spring members 287 carried by the forward extensions 240 of the holder, see Fig. 15, especially.

The rear plate 248 is provided with means for adjusting the end gate 258 and for maintaining the end gate in adjusted position. The adjusting means includes an adjusting screw 284 threaded into an opening formed in a rearwardly extending boss 286 fixed to the rear surface of the rear plate 248. The lower end of the adjusting screw 284 is provided with an enlarged grooved member 288 arranged to receive spaced prongs formed in a horizontal extension of a plate 290. The plate 290 is connected to the end gate 258 by screws 292 which extend through the elongated vertical slot 256. Interposed between the plate 290 and the end gate 258 and held in position by the screws 292 is a resilient member 294 which is provided at its lower end portion with rearward and downward extensions 296 between which the pinch roller 283 is rotatably positioned.

The shaft 266 with the drum 264 thereon is adapted to be continuously rotated and for this purpose the shaft 266 at its right hand end is provided with a spur gear 300 which is in mesh with a spur gear 302 fixed to the left hand end of a stub shaft 304. The shaft 304 is journalled in a bearing (Fig. 3) formed in the lower end portion of a depending bracket 306 suitably secured to the bottom surface of the shelf 230. The right hand end of the shaft 304 is provided with a sprocket wheel 308 which is driven by a chain 310 from a sprocket 312 fixed to the shaft 168. In order to provide ample time, and hence relatively slowly moving parts, to transfer the sheet from the sheet holder to printing position, the distance from the sheet holder exit to printing position is purposely made somewhat greater than the length of a bill sheet and additional means is provided to advance the ejected bill into printing position. Said means includes a pair of pusher members 316 reciprocable in the line of sheet movement, in slots 315 located in the ledge 285 of the shelf and positioned near and within the side edges of the sheet to engage the trailing edge of the sheet and push it off the ledge and advance the sheet into printing position.

The pusher members 316, Figs. 5 and 6, are each provided with a vertical slot or recess 318 for receiving the upper end portions of substantially vertical arms 320 which are formed as a part of a one piece metal strip connected together by a substantially horizontal portion 322. The arms 320 are pivoted to the lower end portion of brackets 324 and 326 which are fixed to the bottom surface of the shelf 230. The shaft 266 has fixed thereto adjacent to the right hand arm 320 an edge cam 328 which is arranged to be rotated to engage a cam roll 330 rotatably secured to the right hand arm 320. The cam roll 330 is maintained in engagement with the periphery of the cam 328 by a tension coil spring 332 which is fixed at one end to the upper end portion of the right hand arm 320 and at its other end to a pin 334 projecting downwardly from the bottom surface of the forward edge portion of the shelf 230.

The cam 328 is so positioned on the shaft 266 that the pusher members 316 are not moved rearwardly to engage the bill until after the next lowermost bill is feeding out of the bottom of the stack with the rear edge portion of the bill just in advance of the pinch roller 283. The pusher members 316 then feed the sheet forwardly into printing position until the rear edge of the sheet falls off the rear edge 336 of the shelf 230. When this feeding operation has been completed, the printing rolls 74 and 76 move downwardly toward the stencils in the track above the leading end portion of the sheet and the right hand platen 128 moves upwardly to perform an addressing operation on the right hand side of the sheet. During this printing operation, the constantly rotating sheet feeding drum 264 continues to advance the second sheet into the position just described with respect to the first sheet.

Under normal conditions of sheet feed, there always is a sheet over the ledge 285. This feature is utilized to stop the machine automatically in the event of failure of a sheet to be ejected from the sheet holder. The machine also is provided with mechanism for stopping the operation of the machine when a sheet is fed improperly between the tracks 234. To this end, the machine is provided with sheet-controlled, electrically operated means for disabling the power mechanism. The rear edge portion of the supporting bar 250 is provided with a rearwardly extending boss 338 having an opening therein forming a bearing for a pin 340 for pivotally supporting a rearwardly and downwardly extending contact carrying arm having at its lower end a contact or sheet-feeding roll 344. The pin 340 is surrounded by an insulating bushing 346 for electrically insulating the arm 342 from the frame of the machine. The roll 344 engages a sheet or bill normally on the ledge 285, which sheet thus prevents the roll 344 from grounding on the frame of the machine. The arm 342 is provided with an electrical conductor 348 which connects the arm 342 to a circuit-controlling contact roll 350, Figs. 7, 8 and 9, which bears against a rotatable circuit-controller 352 fixed to the timing shaft 168. As shown most clearly in Fig. 9, the circuit controller 352 is provided with a collar 354 formed of electrical conducting material which is mounted on an insulating bushing 356 fixed to the shaft 168, which bushing prevents the collar 354 from grounding on the frame of the machine. The collar 354 is provided with a lateral extension 358 which fits into a slot or recess formed in the insulating bushing 356. The contact roll 350 is positioned in line with the path of rotation of the projection so that it is periodically engaged thereby. The contact roll 350 is rotatably mounted in the upper end portion of a substantially vertical arm 362 pivotally secured at its lower end portion to a bracket 364 fixed to and extending above the shelf or bracket 54. The arm 362 is insulated from the bracket 364 by an insulating bushing 365 surrounding a cap screw 366 (Fig. 7) which forms a pivot for the arm 362. The arm 362 is further insulated from the bracket 364 by insulating washers 368 which are disposed on opposite sides of the lower end portion of the arm and prevent contact between the lower end portion of the arm 362 and the cap screw 366 and the bracket 364. The arm 362 has secured thereto one end of an electrical conductor 370 which at its other end is connected to a connector 372 fixed to an insulating block 376 which in turn is secured to the bracket 364. A conductor 378 is also connected to the connector 372 at one end and at its other end to the conductor 348.

Figure 21:
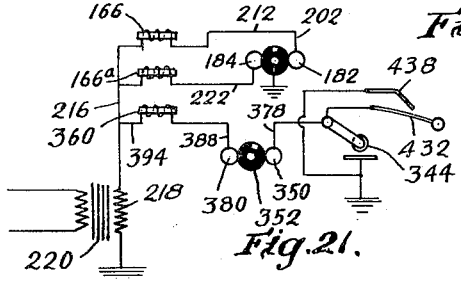
Fig. 21 is a wiring diagram of the printing head and sheet feed control mechanisms.

The contact roller 350 is connected to the machine-stopping electro-magnet 360, Fig. 11, through the collar 354 by a circuit controlling contact roller 380 which is rotatably mounted in the upper end portion of an arm 382 pivoted at its lower end to the bracket 364, said roller being positioned to bear rotatably and continuously against the continuous periphery of the conditioning collar 354. The lower end portion of the arm 382 is electrically insulated from the frame of the machine in the same manner as the arm 362 by means of an insulating bushing surrounding a cap screw 384 and also by insulating washers 386. The arm 382 has fixed thereto one end of an electrical conductor 388 which is connected at its other end to a connector 390 secured to the insulating bracket member 376. The connector 390, see also Fig. 21, is electrically connected by means of a conductor 392 to one terminal of the electro-magnet 360. The other terminal of the electro-magnet 360 is connected by a conductor 394 to the conductor 216 which is connected to one terminal of the secondary winding 218 of the transformer 230. It is apparent from the above that, when the roller 344 is grounded on the ledge 285 of the shelf 230 of the machine and when the projection 288 is in electrical engagement with the contact roller 350, the electrical circuit through the electro-magnet 360 will be completed to energize the electro-magnet.

As shown most clearly in Fig. 11, the electro-magnet 360 is provided with an armature 396 which upon energization of the magnet 360 is moved toward the right. The armature 396 is pivotally connected to a substantially vertically extending arm 398 by a substantially horizontal link 402. The lower end portion of the arm 398 is pivotally connected to the rear end portion of a treadle 404 for controlling the operation of the power mechanism of the machine. The upper end portion of the arm 398 is provided with a reduced upper portion which normally bears against the bottom surface of a member 408. The member 408 has a laterally extending projection 410 which is pivoted between a pair of arms 412 of a bracket 414 fixed to the casing of the power mechanism 108. The member 408 is provided with an opening 416 which is arranged to receive the reduced upper end portion of the arm 398, when the arm is moved toward the right under the influence of the magnet 360. This permits the member 408 to rotate and move downwardly, and permits a pin 418 connected to an arm 420 to move downwardly. Thus, the arm 420 rotates in a clockwise direction as viewed in Fig. 1 to throw out the clutch of the machine and prevents the operation of the sheet feed and stencil printing mechanism.

The stop mechanism is also designed to prevent the operation of the machine when a sheet fails to advance in the sheet guideway and hence crumples as shown, for example, in dotted lines in Fig. 16. To this end, the machine is provided with a sheet-feeling roller 430 composed of insulating material, so that it will not ground its associated circuit when there is no paper sheet under it. Said roll is mounted on the rear end of a light resilient metal strip 432 which at its forward end is secured by screws 434 to an insulating plate 436 fixed to the upper surface of the supporting bar 250. The resilient roll carrying strip 432 and the conductor 348 and arm 342 are electrically connected to the conductor 378 as hereinbefore described. If a sheet is crumpled under the roller 430, the roller 430 and the rear end portion of the resilient arm 432 will be moved upwardly into a dotted line position as shown in Fig. 16, bringing the resilient arm 432 into electrical engagement with a wire band or guard 438 which extends downwardly and rearwardly from the supporting bar 250 and which is secured directly to the cross bar 250 by screws 440 and hence is grounded to the frame of the machine. Thus, the resilient strip 432 will be grounded to complete the circuit through the electro-magnet 360 and thus cause the clutch of the machine to be released to stop the operation of the machine.

As hereinbefore stated, after a second addressing operation has been performed on a sheet, the sheet is fed rearwardly out of printing position and into a receiving holder 442. The paper under the action of the pusher members 316 is fed forwardly and against a sheet-over-travel stop 444 which extends upwardly above the upper surface of the table 30 through an opening 446. The lower end portion of the stop 444 is secured to an arm 448 which extends downwardly and forwardly and is connected to a substantially vertically extending arm 450 which at its lower end portion is connected to a slide block 452 by machine screws 454, see especially Figs. 8 and 10. The lower end portion of the slide block 452 is provided with a generally vertically extending longitudinal slot 456 for receiving the left hand end portion of the shaft 168. The slide block 452 is also provided with a cam roll 458 which normally bears against an edge cam 460 fixed to the shaft 168. The edge cam 460 is provided with a low portion 462 which, when the shaft 168 is rotated in a counter-clockwise direction as viewed in Fig. 10, will permit the arm 450 to move downwardly when the low portion 462 of the edge cam 460 underlies the cam roll 458. The low portion 462 of the cam 460 is so timed that it is arranged to underlie the cam roll 458 after the second printing operation has been performed on the sheet. This permits the stop 444 to move downwardly and out of the path of movement of the sheet. As shown most clearly in Figs. 3 and 13, the leading end portion of the sheet is disposed between the power driven feed roll 464 located above the table 30 and an idler roll 466 normally located below the upper surface of the table but being arranged upon downward movement of the stop member 444 to be moved upwardly and into pressure engagement with the lower surface of the leading end portion of the sheet to move the sheet into engagement with the feed roll 464.

The idler roll 466 is rotatably mounted in the rear end portion of a lever 468 which is pivotally secured at 470 intermediate its ends to the lower end portion of a depending bracket 472 which is fixed to the bottom surface of the table 30. The other end portion of the lever 468 is pivotally secured at 474 to an upward extension of the arm 450. Thus, when the arm 450 is moved downwardly, as above described, the lever 468 will be rotated about its pivot point 470 in a clockwise direction, thus moving the idler roll 466 against the lower surface of the bed and against and into engagement with the constantly rotating feed roll 464. The arm 450 and, consequently, the lever 468 is urged downwardly by a tension spring 476 surrounding a pin 478 pivotally secured to a bracket 480 fixed to the bottom surface of the table 30. The spring 476 is interposed between the end portions of the lever 468 and a boss 482 formed in the upper end portion of the pin 478 to maintain the cam roll 458 against the edge cam 460.

The feed roll 464 is mounted on a shaft 484 and is fixed thereto. The shaft 484 is journalled in suitable bearings formed in the upper end portions of brackets 486 projecting upwardly from the upper surface of the table 30. As shown in Fig. 4, the left hand end of the shaft 484 has fixed thereto a pulley 488 which is driven by a crossed belt 490 (Fig. 3) from a pulley 492 fixed to a stub shaft 494 journalled in a suitable bearing formed in the upper end of a bracket 496 fixed to the top surface of the table adjacent to the left hand rear edge portion thereof. The shaft 494 is also provided with a pulley 498 which is belt driven from a pulley 502 fixed to the left hand end of a substantially horizontal shaft 504 journalled in suitable bearings formed in a bracket member 506 extending below and fixed to the rear edge portion of the table 30. The right hand end of the shaft 504 is provided with a pulley 508 which is driven by a cross belt 510 by a pulley 512 fixed to the power mechanism of the machine.

In the present machine, a stencil is required to be fed from the right hand to the left hand printing position between successive printing operations. Since a stencil in the first printing position is fed out of that position and into the second printing position by the advance of a new stencil no stencil feed is desired after the second printing operation. That is to say, there should be no stencil feed after the printing operation of the left hand printing mechanism and before the printing operation of the right hand printing mechanism. Thus, the stencil feed is disabled for one printing operation following each two printing operations. The mechanism for effecting this result is more or less common in the art and is illustrated in Fig. 2. The link 40 that connects the pusher 38 with its reciprocating mechanism has an L-shaped slot and pin connection 513 with the pusher. A rotatable cam 514 through an intervening pivoted lever 516 controls the position of the pusher pin 518 in either the short or the long leg of the slot. When the pin is in the long leg the link 40 can reciprocate without moving the pusher. When the pin is in the short leg, the link is caused to reciprocate the pusher. The cam wheel 514 is advanced in a step by step manner by means of a pawl 520 which engages teeth of a ratchet, not shown, fixed to the cam wheel, the pawl being reciprocated by means including a link 522 connected to the oscillating pusher operating arm 42. The arrangement is such that a lobe of the cam confronts the pivoted lever 516 and holds the link 40 in a laterally displaced position where the pin is in the long leg of the slot for one printing operation and where a dwell portion of the cam confronts the pivoted lever 516 for two printing operations.

The product of the machine is illustrated in Fig. 20 wherein the bill a has an address b applied first in the upper right hand portion of the sheet by the printing mechanism including the right hand printing or impression roll 74 and then has a repetition of the same address b' applied in the upper left hand portion of the bill by the printing mechanism including the left hand printing roller 76. The bill is provided with a line of severance 524 under the second applied address but the line of severance is terminated short of the location of the first address. Thus, the left hand address may be severed from the body of the bill and returned with the check or other means of payment of the account represented by the bill and the biller will have a positive identification of the address of the one paying the bill. The one paying the bill also has definite assurance that the bill belongs to him.

Having thus described my invention, what I claim as new and desire to secure by Letters Patent of the United States is:

1. In an addressing machine, means for moving successive printing devices into and out of successive printing positions, printing means located in successive printing positions, and means for operating the printing means alternately in continuous succession as the printing devices are moved into successive printing positions, said means for moving successive printing devices being operative to move a printing device from one into the other printing position only after a printing operation of both printing means.

2. In an addressing machine, means for moving successive address printing devices into and out of successive address printing positions, printing means located in successive address printing positions, mechanism for operating said printing means, and means for operatively connecting the operating mechanism to successive printing means in a continuous alternating succession as the address printing devices are moved into and out of successive address printing positions, said means for moving the address printing devices being operative to advance the succession of devices only after printing operations of said printing means at successive address printing positions.

3. In an addressing machine, means for moving successive address printing devices into and out of successive printing positions only after printing operations at the successive printing positions, anvils reciprocable into and out of printing position, printing heads associated with said anvils reciprocable into and out of printing position, mechanism operative to reciprocate said anvils and printing heads, and means arranged to connect successive anvils in continuous alternating succession with the reciprocating mechanism to cause alternate reciprocation of the successive anvils as the printing device is moved into successive address printing positions.

4. In an addressing machine, a plurality of anvils reciprocable into and out of work supporting position, a printing head associated with each of said anvils and reciprocable into and out of work engaging position, means for moving successive address printing devices into and out of successive printing positions only after printing operations of both printing heads, mechanism operative to reciprocate each of said anvils and printing heads conjointly, and means for connecting successive anvils alternately with the reciprocating mechanism to cause alternate reciprocation of the successive anvils to print successive addresses as a printing device is moved into successive address printing positions.

5. In an addressing machine arranged to operate upon a collection of printing devices, two printing mechanisms, means for advancing successive printing devices into one and thence into the other printing mechanism only after printing operations of both printing mechanisms, means for operating the printing mechanisms, means arranged operatively to connect the first printing mechanism with the operating mechanism while the other printing mechanism is inoperative, and means acting in timed relation with the connecting means for rendering the first printing mechanism inoperative and for rendering the second printing mechanism operative whereby successive printing operations are performed upon the printing devices in successive printing positions.

6. In an addressing machine, means for moving successive address printing devices into and out of successive address printing positions only after printing operations at the successive address printing positions, a pair of work supporting anvils at the successive printing positions on one side of the printing devices, a pair of printing heads on the other side of the printing devices opposite the anvils, means for conjointly reciprocating each printing head and its associated anvil, and means arranged to connect the anvils in continuous alternating succession with the reciprocating means as a printing device is moved into successive printing positions above said anvils.

7. In an addressing machine, means for moving successive printing devices into and out of successive address printing positions only after printing operations at the successive address printing positions, a plurality of work supporting anvils and cooperating printing heads at said address printing positions, mechanism for conjointly reciprocating each printing head and its cooperating anvil including an oscillating cam associated with each anvil, means for operatively connecting each anvil with its cooperating cam, and means arranged to move said connecting means in continuous alternating succession into and out of operative positions with successive anvils as the printing device is moved into successive printing positions.

8. In an addressing machine, means for moving successive printing devices into and out of successive address printing positions only after printing operations at the successive address printing positions, a plurality of work supporting anvils and cooperating printing heads at said address printing positions, mechanism for conjointly reciprocating each printing head and its cooperating anvil including an oscillating cam associated with each anvil, means for operatively connecting each anvil with its cooperating cam, and electromagnetic means controlled by said reciprocating mechanism for moving the connecting means in continuous alternating succession into inoperative position.

9. In an addressing machine, means for moving successive printing devices into and out of successive address printing positions only after printing operations at the successive address printing positions, a plurality of work supporting anvils and cooperating printing heads at said address printing positions, mechanism for conjointly reciprocating each printing head and its cooperating anvil including an oscillating cam associated with each anvil, means for operatively connecting each anvil with its cooperating cam, spring means normally urging said connecting means into operative position, and electro-magnetic means controlled by said reciprocating mechanism arranged to hold the connecting means in continuous alternating succession out of operative position.

10. In an addressing machine, means for moving successive printing devices into and out of successive address printing positions only after printing operations at the successive address printing positions, a plurality of work supporting anvils and cooperating printing heads at said address printing positions, mechanism for conjointly reciprocating each printing head and its cooperating anvil including an oscillating cam associated with each anvil, a cam roll associated with each cam and movable into and out of operative position, spring means normally maintaining and urging the cam rolls into operative position, and electro-magnetic means operating successively against the pressure of said spring means for rendering a continuous alternating succession of anvils inoperative after printing operations have been performed by successive cooperating anvils and printing heads.

11. In an addressing machine, means for moving successive address printing devices into and out of successive printing positions only after printing operations at the successive printing positions, printing mechanisms located at such printing positions, and means for rendering said printing mechanisms operated in alternating succession and for arresting operation of one of said printing mechanisms when another is operative.

12. In an addressing machine, two printing mechanisms, means for advancing a series of address printing stencils into and out of operative relation with said printing mechanisms only after printing operations of the plurality of printing mechanisms and in succession from one to another printing mechanism, and means acting in timed relation to the progression of a stencil from one printing mechanism to another and including members operative alternately and in continuous succession to render only the printing mechanism immediately associated with the progressed stencil operative to effect an address printing operation therefrom.

13. In an addressing machine, two printing mechanisms, means for advancing a series of address printing stencils into and out of operative relation with said printing mechanisms only after printing operations of the plurality of printing mechanisms and in succession from one to another printing mechanism, means acting in timed relation to the progression of a stencil from one printing mechanism to another and including members operative alternately and in continuous succession to render only the printing mechanism immediately associated with the progressed stencil operative to effect an address printing operation therefrom, and means to operate portions of the parts of the other mechanism but to render said other mechanism ineffective upon any stencil associated therewith.

14. In an addressing machine, printing mechanism comprising pairs of cooperating impression rolls and platens, cam means associated with each platen for normally effecting reciprocation thereof, means for oscillating said cam means conjointly, and means interposed between said cam means and said platens and responsive to a condition of the operation of the machine for automatically effecting the operation of a different platen by its associated cam upon successive printing operations.

15. In an addressing machine, plural printing mechanisms, each having a reciprocatory platen and a cam for reciprocating the platen, means for conjointly reciprocating all cams, operative connections between said cams and platens, electro-magnetically controlled means for controlling the operative connection between a platen and its associated cam, and circuit controlling means for said electro-magnetic means cyclically responsive to operation of the machine for controlling the effectiveness of said operative connections for selecting different platens for operation by their associated cams and for maintaining other platens out of operative relation with their associated cams.

16. In an addressing machine, printing mechanism including a reciprocating platen, an oscillating cam for reciprocating said platen, a cam roller for establishing an operative connection between said platen and cam for obtaining the reciprocation of said platen by said cam, electro-responsive means for controlling the position of said roller to prevent and also to effect the reciprocation of said platen, and circuit controlling means for said electro-magnetic means cyclically responsive to successive printing operations of the machine for periodically controlling said electro-magnetic means to alternately position said roller into and out of position for effecting reciprocation of said platen.

17. In an addressing machine, printing mechanism including a reciprocating platen, an oscillating cam for reciprocating said platen, a cam roller adapted to be interposed between said platen and cam for transmitting movement of said cam to said platen, means constantly urging said cam for movement into alignment with said cam, and electro-responsive means for displacing said roller to one side of said cam and for holding said roller in displaced position at least until said cam has been advanced into the path of movement of said roller whereupon said cam will maintain said roller in displaced position until the completion of the oscillatory movement of said roller.

18. In an addressing machine, printing mechanism including a reciprocating platen, an oscillating cam disposed beneath said platen, a cam roller interposed between said cam and platen and adapted to be disposed in alignment with said cam to transmit the motion thereof to said platen, spring means yieldingly maintaining said roller in the aforesaid relation, and electro-responsive means for displacing said roller from said position to a position at one side of said cam and where said cam can traverse the path of movement of said roller under urge of said spring means and thereby maintain said roller in displaced position until the completion of an oscillatory movement of said cam.

19. In an addressing machine, dual and separately operable printing mechanisms, means for advancing a successive of address printing devices in succession from one to the other of said printing mechanisms only after printing operations by both printing mechanisms, means for operating said printing mechanisms separately and alternately to effect a printing operation upon the same address bearing device by both printing mechanisms, sheet feeding means for advancing a succession of sheets into printing position with respect to both printing mechanisms, and means for removing a sheet from the printing position following printing operations of both printing mechanisms on the sheet.

20. In an addressing machine, two printing mechanisms operative separately and in continuous succession, means for advancing a succession of printing devices into and out of the action of said printing mechanisms only after printing operations by both mechanisms, and means for advancing a succession of sheets in partially overlapping relation into the action of said printing mechanisms and thence out of said printing mechanisms, each sheet receiving a printing impression from the same printing device by each of the printing mechanisms.

21. In an addressing machine, two printing mechanisms, means for operating said mechanisms alternately in continuous succession, means for feeding consecutive printing devices in a step by step manner through both mechanisms in succession and for feeding a printing device from one to the other mechanism only after a printing operation of both mechanisms, means for presenting a work sheet to both mechanisms at the same time, and means for removing the sheet from both mechanisms after a printing operation of both mechanisms thereon from the same printing device.

22. In an addressing machine, means for moving consecutive printing devices conjointly into two successive printing positions and each printing device in succession from one directly to the other printing position, means at each of the two printing positions including parts separately movable and operated alternately in continuous succession for printing the data contained on one of said printing devices in one printing position and for printing the same data contained on said printing device after it has been moved into the next printing position, means for advancing a sheet into position to occupy both printing positions prior to the first printing operation on a printing device, and means for removing the sheet from both said printing positions after the last printing operation on the same printing device, said means for moving consecutive printing devices being operative to feed a printing device from one into the other printing position only after a printing operation of both printing means.

23. In an addressing machine, printing mechanisms at two printing positions, means for moving a succession of address printing devices in succession to the action of each printing mechanism, means for advancing a work sheet to the action of said printing mechanisms transversely of the line of movement of said address printing devices, and means for operating the printing mechanisms at the different printing positions separately and in continuous succession, said means for moving the address printing devices being operative to advance an address printing device from one to another printing position only after printing operations of both of said printing mechanisms, and said means for advancing a work sheet to the action of said printing mechanisms being operative only after printing operations of both said printing mechanisms and before a printing operation which next precedes a said advance of an address printing device.

24. In an addressing machine, printing mechanisms at two printing positions, means for moving a succession of address printing devices in succession to the action of each printing mechanism, means for advancing a succession of work sheets to the action of said printing mechanisms, the said advance of the work sheets being in a straight line transversely of the direction of movement of said address printing devices, and means for operating the printing mechanisms at the different printing positions separately and in continuous succession, said means for moving the address printing devices being operative to advance an address printing device from one to another printing position only after printing operations of both of said printing mechanisms, and said means for advancing a work sheet to the action of said printing mechanisms being operative only after printing operations of both said printing mechanisms and before a printing operation which next precedes a said advance of an address printing device.

HARMON P. ELLIOTT.